United States Patent
Shu et al.

(10) Patent No.: US 12,286,550 B2
(45) Date of Patent: Apr. 29, 2025

(54) AQUEOUS POLYMER DISPERSION AND AQUEOUS COATING COMPOSITION COMPRISING THE SAME

(71) Applicants: Dow Global Technologies LLC, Midland, MI (US); Rohm and Haas Company, Collegeville, PA (US)

(72) Inventors: Shujun Shu, Shanghai (CN); Yujiang Wang, Shanghai (CN); Baoqing Zheng, Shanghai (CN); Jia Tang, Phoenixville, PA (US)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 0 days.

(21) Appl. No.: 16/461,824

(22) PCT Filed: Dec. 19, 2016

(86) PCT No.: PCT/CN2016/112926
§ 371 (c)(1),
(2) Date: May 17, 2019

(87) PCT Pub. No.: WO2018/119835
PCT Pub. Date: Jul. 5, 2018

(65) Prior Publication Data
US 2019/0359843 A1    Nov. 28, 2019

(51) Int. Cl.
| | | |
|---|---|---|
| *C09D 133/12* | (2006.01) | |
| *C08F 212/08* | (2006.01) | |
| *C08F 220/18* | (2006.01) | |
| *C09D 125/14* | (2006.01) | |
| *C09D 133/06* | (2006.01) | |

(52) U.S. Cl.
CPC .......... *C09D 133/12* (2013.01); *C08F 212/08* (2013.01); *C08F 220/1808* (2020.02); *C09D 125/14* (2013.01); *C09D 133/064* (2013.01); *C08F 220/1806* (2020.02); *C08F 2800/20* (2013.01)

(58) Field of Classification Search
None
See application file for complete search history.

(56) References Cited

U.S. PATENT DOCUMENTS

| | | | | |
|---|---|---|---|---|
| 5,332,854 | A * | 7/1994 | Yokota | B01F 17/0057 558/33 |
| 5,385,960 | A * | 1/1995 | Emmons | C09D 17/008 523/205 |
| 6,566,472 | B1 * | 5/2003 | Baumstark | E04C 2/042 526/263 |
| 6,756,459 | B2 | 6/2004 | Larson et al. | |
| 8,133,961 | B2 | 3/2012 | Hsu et al. | |
| 9,102,603 | B2 | 8/2015 | Ogasawara et al. | |
| 9,708,501 | B2 | 7/2017 | Liu et al. | |
| 10,597,550 | B2 * | 3/2020 | Yang | C09D 133/10 |
| 2009/0326142 | A1 * | 12/2009 | Agnely | C09D 151/003 524/523 |
| 2012/0214928 | A1 * | 8/2012 | Raman | C09D 15/00 524/430 |
| 2015/0011790 | A1 * | 1/2015 | Ogasawara | C07F 9/3808 558/175 |
| 2015/0307716 | A1 | 10/2015 | Jahns et al. | |
| 2019/0292399 | A1 * | 9/2019 | Shu | C08F 220/1806 |

FOREIGN PATENT DOCUMENTS

| | | |
|---|---|---|
| AU | 2013200757 B2 | 6/2014 |
| CN | 103797034 B | 3/2015 |

* cited by examiner

*Primary Examiner* — Satya B Sastri
(74) *Attorney, Agent, or Firm* — CANTOR COLBURN LLP

(57) ABSTRACT

An aqueous polymer dispersion and an aqueous coating composition comprising the aqueous polymer dispersion, and the aqueous coating composition providing the resulting coatings with good anti-corrosion property.

7 Claims, No Drawings

AQUEOUS POLYMER DISPERSION AND AQUEOUS COATING COMPOSITION COMPRISING THE SAME

FIELD OF THE INVENTION

The present invention relates to an aqueous polymer dispersion and an aqueous coating composition comprising the same.

INTRODUCTION

Solvent borne coating compositions comprising epoxy resins, polyurethane, or alkyl resins are widely used in metal protective coatings due to their anti-corrosion performance, durability, appearance and gloss. Waterborne acrylic polymer dispersions have much less environmental concerns than solvent borne dispersions and are usually used for light to medium duty metal protection.

U.S. Pat. No. 6,756,459 B2 discloses an aqueous emulsion copolymer comprising as polymerized units, 28-29% styrene, 36-37% ethylhexyl acrylate, 31-32% methyl methacrylate, and 2.5-3% phosphoethyl methacrylate. Such aqueous emulsion copolymer can provide coatings with improved gloss and corrosion resistance when applied to metal substrates, for example, exhibiting no greater than 20% rust or a blister rating no greater than "M" after at least 7 days of exposure to salt spray according to the ASTM B-117-97 method. For some coating applications, such as general industrial finishes and agriculture construction equipments coatings, it requires coatings with even better anti-corrosion performance to sustain at least 240 hours salt-spray testing at a dry film thickness of about 40-50 μm or even lower.

Coating compositions need to be heat-age stable to avoid viscosity increase during storage, e.g., a viscosity change no more than 10 Krebs units (KU) after storage at 50° C. for 10 days. Moreover, waterborne coatings in many applications are required to have sufficient water-resistance and adhesion to a substrate to meet industry requirements.

Therefore, there remains a need to provide an aqueous polymer dispersion suitable for heat-age stable coating applications, which provide coatings with the above-described anti-corrosion as well as other desirable properties.

SUMMARY OF THE INVENTION

The present invention achieves the above-described anti-corrosion property by providing a novel aqueous polymer dispersion and an aqueous coating composition comprising the same. The aqueous coating composition has good heat-age stability as indicated by the change of Krebs Units (KU), ΔKU, of 10 KU or less, after heat aging at 50° C. for 7 days. The aqueous coating composition also exhibits less than 5% rust and a blister rating "2F" or better at a dry film thickness of 50±10 μm after at least 240 hours of exposure to salt spray when coated onto a corrosion susceptible substrate, such as cold rolled steel. The aqueous coating composition may also demonstrate an adhesion rating of "4B" or higher, and/or a water resistance level of "2F" or better, at a dry film thickness of 50±10 μm, when coated onto a corrosion susceptible substrate such as cold rolled steel. The above properties were measured according to the test methods described in the Examples section below.

In a first aspect, the present invention is an aqueous polymer dispersion, wherein the polymer comprises as polymerized units, based on the weight of the polymer, (a) from 10% to 60% by weight of styrene or substituted styrene,
(b) from 0.2% to 3.0% by weight of a phosphorous-containing (meth)acrylate,
(c) from 0.2% to 1.2% by weight of a ureido monomer, and
(d) more than 0.5% by weight of a polymerizable surfactant having the structure of formula (I),

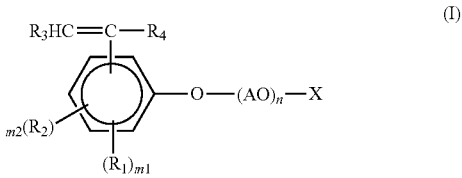

wherein $R_1$ is a phenyl group or a phenyl substituted alkyl group; m1 is 0, 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 0 to 1,000; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue; and (e) from 10% to 60% by weight of a soft monomer.

In a second aspect, the present invention is an aqueous coating composition comprising the aqueous polymer dispersion of the first aspect.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Glass transition temperature ($T_g$) herein refers to $T_g$s calculated by using the linear equation, for example, $$T_g = W_a * T_{ga} + W_b * T_{gb} + W_e * T_{gc}$$

wherein $T_{ga}$, $T_{gb}$, and $T_{gc}$ refer to $T_g$ of homopolymers of Monomer a, Monomer b, and Monomer c, respectively; and $W_a$, $W_b$, and $W_e$ refer to the weight fraction of Monomer a, Monomer b, and Monomer c, based on the weight of total monomers, respectively.

The polymer useful in the present invention may comprise, as polymerized units, styrene, substituted styrene, or mixtures thereof. The substituted styrene may include, for example, benzyl acrylate, 2-phenoxyethyl acrylate, butylstryene, methylstyrene, p-methoxystyrene, or mixtures thereof. The polymer may comprise as polymerized units, based on the weight of the polymer, 10% by weight or more, 15% by weight or more, 20% by weight or more, 25% by weight or more, or even 30% by weight or more, and at the same time, 60% by weight or less, 50% by weight or less, or even 45% by weight or less, of styrene, substituted styrene, or mixtures thereof. "Weight of the polymer" in the present invention refers to the dry or solid weight of the polymer.

The polymer useful in the present invention may comprise, as polymerized units, one or more phosphorous-containing (meth)acrylates. Examples of suitable phosphorous-containing (meth)acrylates include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_1O)_n-P(O)(OH)_2$, wherein $R=H$ or $CH_3$, $R_1$=alkyl, and n=2-6, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorous-containing (meth)acrylates are dihydrogen phosphate monomers, which include 2-phosphoethyl (meth)acrylate, 2-phosphopropyl (meth)acrylate, 3-phosphopropyl (meth)acrylate, 3-phospho-2-hydroxypropyl (meth)acrylate, SIPOMER PAM-100, SIPOMER PAM-200, SIPOMER PAM-300, or mixtures thereof. More preferably, the phosphorous-containing (meth)acrylate is phosphoethyl methacrylate. The polymer useful in the present invention may comprise as polymerized units, based on the weight of the polymer, 0.2% by weight or more, 0.5% by weight or more, or even 1.0% by weight or more, and at the same time, 3.0% by weight or less, 2.5% by weight or less, 2.0% by weight or less, or even 1.5% by weight or less, of the phosphorous-containing (meth)acrylate.

The polymer useful in the present invention may further comprise, as polymerized units, one or more ureido monomers. As used herein, the term "ureido monomers" refers to an ethylenically unsaturated compound comprising a cyclic ureido group (i.e., an imidazolidin-2-one group). Preferred ureido monomers are ureido group containing (meth)acrylic acid alkyl esters. Examples of suitable ureido monomers are illustrated below:

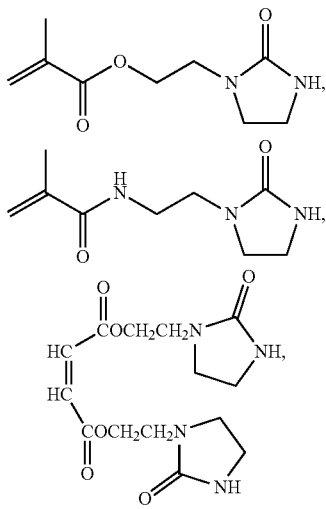

mixtures thereof. The polymer may comprise as polymerized units, based on the weight of the polymer, 0.2% by weight or more, 0.3% by weight or more, 0.4% by weight or more, or even 0.5% by weight or more, and at the same time, 1.2% by weight or less, 1.0% by weight or less, 0.9% by weight or less, 0.8% by weight or less, or even 0.75% by weight or less, of the ureido monomer.

The polymer useful in the present invention may further comprise, as polymerized units, one or more polymerizable surfactants. The polymerizable surfactants may contain at least one carbon-carbon double bond. The polymerizable surfactants may have the structure of formula (I),

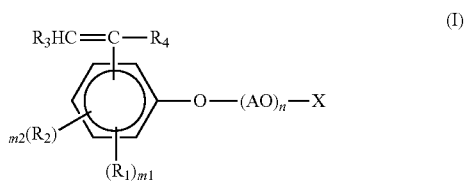

wherein $R_1$ is a phenyl group or a phenyl substituted alkyl group;

m1 is an integer from 0 to 4, for example, 0, 1, 2, 3 or 4, preferably from 1 to 3; $R_2$ is an alkyl or a substituted alkyl, preferably a $C_1$-$C_4$ alkyl or a substituted $C_1$-$C_4$ alkyl;

m2 is 0 or 1;

$R_3$ is hydrogen or a $C_1$-$C_{20}$ or $C_1$-$C_4$ alkyl group such as methyl;

$R_4$ is hydrogen or a $C_1$-$C_{20}$ or $C_1$-$C_4$ alkyl group such as methyl;

A represents an alkylene group or a substituted alkylene group, having 2 to 4 carbon atoms;

n represents an average addition mole number of alkylene oxide and is an integer in the range of from 0 to 1,000, from 1 to 100, from 2 to 60, from 3 to 50, or from 4 to 40; and X represents hydrogen or an anionic hydrophilic group selected from $-(CH_2)_a-SO_3M$, $-(CH_2)_b-COOM$, $-PO_3M_2$, $-P(Z)O_2M$, or $-CO-CH_2-CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue.

In one embodiment, the polymerizable surfactant has the structure of formula (II),

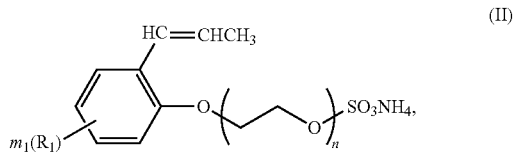

wherein $R_1$, $m_1$, and n are as defined above in formula (I).

In formula (I) or (II), preferred $R_1$ has the structure of

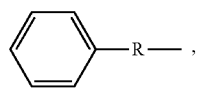

wherein R is an alkylene group having one to four carbon atoms, preferably two to three carbon atoms, such as for example,

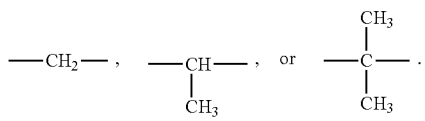

Preferred m1 is 3. In one preferred embodiment, in formula (II), m is 1, 2, 3 or 4, preferably 3; n is in the range of from 4 to 40; and $R_1$ is

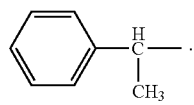

The polymer may comprise as polymerized units, based on the weight of the polymer, more than 0.5% (>0.5%) by weight of the polymerizable surfactant, for example, 0.6% by weight or more, 0.7% by weight or more, 0.8% by weight or more, or even 1.0% by weight or more, and at the same time, 4% by weight or less, 3% by weight or less, 2.5% by weight or less, 2.0% by weight or less, or even 1.5% by weight or less, of the polymerizable surfactant.

The polymer useful in the present invention may also comprise, as polymerized units, one or more soft monomers. As used herein, the term "soft monomers" refers to a compound, whose homopolymer has a $T_g$ less than 25° C. The soft monomers preferably have a $T_g$ of 0° C. or lower, −20° C. or lower, −50° C. or lower, or even −60° C. or lower. The soft monomers may be selected from $C_3$-$C_{20}$ alkyl esters of (meth)acrylic acid, or mixtures thereof. Examples of soft monomers include vinyl esters of versatic acid, butyl acrylate, 2-ethylhexylacrylate, lauryl acrylate, n-butyl methacrylate, lauryl methylacrylate, n-decyl methacrylate, isobutyl acrylate, stearyl methacrylate, isodecyl acrylate, or mixtures thereof. Preferred soft monomer are $C_3$-$C_{20}$ alkyl esters of (meth)acrylic acid, such as 2-ethylhexylacrylate, ethyl methacrylate, 2-ethylhexyl methacrylate, or mixtures thereof. The polymer may comprise as polymerized units, based on the weight of the polymer, 10% by weight or more, 20% by weight or more, or even 30% by weight or more, and at the same time, 60% by weight or less, 50% by weight or less, or even 40% by weight or less, of the soft monomer.

The polymer useful in the present invention may further comprise, as polymerized units, one or more additional hard monomers. As used herein, the term "additional hard monomers" refers to a compound that excludes styrene and substituted styrene described above, whose homopolymer has a $T_g$ higher than 25° C. The additional hard monomers preferably have a $T_g$ of 50° C. or higher, 80° C. or higher, or even 100° C. or higher. The glass transition temperatures of homopolymers may be found, for example, in "Polymer Handbook", edited by J. Brandrup and E. H. Immergut, Interscience Publishers. The additional hard monomers may be selected from cycloalkyl (meth)acrylate, a, (3-ethylenically unsaturated carboxylic acids or salts thereof, acrylamide, methacrylamide, ethyl methacrylate, t-butyl methacrylate, isobutyl methacrylate, tertiarybutyl methacrylate, methacrylate, methyl methacrylate, 2-hydroxyl methacrylate; (meth) acrylonitrile, ethyleneglycol dimethacrylate, or mixtures thereof. Examples of suitable cycloalkyl (meth) acrylates include cyclohexyl (meth)acrylate, methcyclohexyl acrylate, isobornyl methacrylate, isobornyl acrylate, dihydrodicyclopentadienyl acrylate, or mixtures thereof. Examples of suitable ethylenically unsaturated carboxylic acids and salts thereof as the additional hard monomers include (meth)acrylic acids, itacolic acid, or fumaric acid; or a monomer bearing an acid-forming group which yields or is subsequently convertible to, such an acid group (such as anhydride, (meth)acrylic anhydride, or maleic anhydride); p-styrenesulfonic acid sodium salt (SSS); or mixtures thereof.

Preferred additional hard monomers useful in the present invention include methacrylic acid, acrylic acid, methyl acrylate, cyclohexyl methacrylate, ethyl methacrylate, 2-hydroxyl methacrylate, acrylonitrile, or mixtures thereof. More preferably, cyclohexyl methacrylate, acrylonitrile, or mixtures thereof are used. The polymer may comprise as polymerized units, based on the weight of the polymer, from 0 to 40% by weight, from 10% to 30% by weight, from 15% to 25% by weight, of the additional hard monomer.

In one embodiment, in addition to styrene or substituted styrene, the phosphorous-containing (meth)acrylate, the ureido monomer, the polymerizable surfactant, and the soft monomer, as polymerized units, the rest of the polymer is polymerized units of the additional hard monomers. Total weight concentration of polymerized units of the polymer is equal to 100%.

The polymer useful in the present invention may have a weight average molecular weight of from 10,000 to 300,000, from 20,000 to 200,000, or from 40,000 to 150,000. The weight average molecular weight may be measured by Gel Permeation Chromatography (GPC) calibrated by polystyrene standard.

The types and levels of monomers that constitute the polymerized units of the polymer upon polymerization may be chosen to provide the polymer with a $T_g$ suitable for different applications. The $T_g$ of the polymer useful in the present invention may be 20° C. or higher, 30° C. or higher, or even 35° C. or higher, and at the same time, 60° C. or lower, 55° C. or lower, or even 50° C. or lower.

Preferably, the polymer useful in the present invention comprises as polymerized units, based on the weight of the polymer,
(a) from 10% to 60% by weight of styrene;
(b) from 0.2% to 3.0% by weight of a phosphoalkyl (meth)acrylate, such as phosphoethyl (meth)acrylate, phosphopropyl (meth)acrylate, phosphobutyl (meth) acrylate, or mixtures thereof;
(c) from 0.2% to 1.2% by weight of the ureido monomer;
(d) from 0.6% to 1.5% by weight of the polymerizable surfactant;
(e) from 20% to 50% by weight of the soft monomer, such as butyl acrylate, 2-ethylhexylacrylate, lauryl acrylate, n-decyl methacrylate, isobutyl acrylate, or mixtures thereof; and
(f) from 0 to 40% by weight of the additional hard monomer, such as (meth)acrylonitrile, cyclohexyl methacrylate, methacrylic acid, acrylic acid, methyl methacrylate, ethyl methacrylate, tertiarybutyl methacrylate, phenyl methacrylate, isobornyl methacrylate, hydroxypropyl methacrylate, or mixtures thereof.

A process of preparing the polymer useful in the present invention may include polymerization techniques well known in the art. The polymer may be prepared in an aqueous medium by a free-radical polymerization of monomers used to prepare the polymer in the presence of the chain transfer agent to form the aqueous polymer dispersion.

Emulsion polymerization of the monomers described above is a preferred process. Monomers refer to compounds or monomers described above used to make the polymer, i.e., form the polymerized units of the polymer after polymerization. Monomers for preparing the polymer may include styrene or substituted styrene, the phosphorous-containing (meth)acrylate, the polymerizable surfactant, the ureido monomer, the soft monomer, and optionally the additional hard monomer described above. In one embodiment, total weight concentration of styrene or substituted styrene, the phosphorous-containing acid monomer, the polymerizable surfactant, the ureido monomer, the soft monomer, and optionally the additional hard monomer is equal to 100%. The weight content of each monomer based on the total weight of monomers may be substantially the same as the weight content of such monomer as polymerized units based on the weight of the polymer as described above. Total weight concentration of the monomers for preparing the polymer is equal to 100%. A mixture of the monomers for preparing the polymer may be added neat or as an emulsion in water; or added in one or more additions or continuously, linearly or nonlinearly, over the reaction period of preparing the polymer, or combinations thereof. Temperature suitable for emulsion polymerization processes may be lower than 100° C., in the range of from 30 to 95° C., or in the range of from 50 to 90° C. Multistage free-radical polymerization using the monomers described above can be used, which at least two stages are formed sequentially, and usually results in the formation of the multistage polymer comprising at least two polymer compositions. Each stage of the free-radical polymerization can be conducted by emulsion polymerization of the monomers described above.

In the polymerization process of preparing the polymer useful in the present invention, free radical initiators may be used. The polymerization process of the polymer may be thermally initiated or redox initiated emulsion polymerization, and preferably in each stage when multistage polymerization process is used. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the polymer useful in the present invention, a non-polymerizable surfactant may be used. The non-polymerizable surfactant may be added prior to or during the polymerization of the monomers, or combinations thereof. A portion of the surfactant can also be added after the polymerization. Surfactants may be used for both stages or only in the first stage when multistage polymerization is used. Such surfactants may include anionic and/or nonionic emulsifiers. Examples of suitable non-polymerizable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The combined amount of the non-polymerizable surfactant used is usually from 0.1% to 6% by weight or from 0.5% to 1.5% by weight, based on the weight of total monomers used for preparing the aqueous polymer dispersion of the present invention.

In the polymerization process of preparing the polymer useful in the present invention, one or more chain transfer agents may be used to reduce the molecular weight of the emulsion polymer and/or to provide a different molecular weight distribution than would otherwise have been obtained with any free-radical-generating initiator(s). The chain transfer agent may be selected from halogen compounds such as tetrabromomethane; allyl compounds; or mercaptans such as alkyl thioglycolates, alkyl mercaptoalkanoates, and $C_4$-$C_{22}$ linear or branched alkyl mercaptans. Linear or branched $C_4$-$C_{22}$ alkyl mercaptans such as n-dodecyl mercaptan and t-dodecyl mercaptan are preferred. The chain transfer agent may be added in one or more additions or continuously, linearly or not, over most or all of the entire reaction period or during limited portion(s) of the reaction period such as, for example, in the kettle charge and in the reduction of residual monomer stage. The chain transfer agent may be used in an amount of from 0 to 5% by weight or from 0.2% to 1% by weight, based on the total weight of monomer used to form the polymer.

After polymerization, the obtained polymer may be neutralized by using one or more bases as neutralizers. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The average particle diameter of the polymer in the aqueous polymer dispersion of the present invention may be from 50 nanometers (nm) to 150 nm or from 70 nm to 120 nm, as measured by a BI-90 Particle Size Analyzer.

The aqueous polymer dispersion of the present invention further comprises water. The concentration of water may be, by weight based on the total weight of the aqueous dispersion, from 30% to 90% or from 40% to 80%. The aqueous dispersion of the present invention may be useful in many applications including, for example, marine and protective coatings, general industrial finish, metal protective coatings, wood coatings, architecture coatings, traffic paints, paper coatings, leather coatings, and architectural coatings. The present invention also provides an aqueous coating composition comprising the aqueous polymer dispersion described above. The aqueous polymer dispersion in the aqueous coating composition of the present invention may be present, by solids weight based on the total weight of the aqueous coating composition, in an amount of 10% or more, 13% or more, or even 15% or more, and at the same time, 70% or less, 50% or less, or even 35% or less.

The aqueous coating composition of the present invention may also comprise pigments and/or extenders to form pigmented coating compositions (also known as "paint formulations"). The term "pigment" refers to a particulate inorganic material which is capable of materially contributing to the opacity or hiding capability of a coating. Such materials typically have a refractive index greater than 1.8 and include, for example, titanium dioxide ($TiO_2$), zinc oxide, iron oxide, zinc sulfide, barium sulfate, barium carbonate, and anticorrosive pigments such as zinc phosphate, calcium phosphate complex; or mixtures thereof. The term "extender" refers to a particulate inorganic material having a refractive index of less than or equal to 1.8 and greater than 1.3. Examples of suitable extender include talc (hydrated magnesium silicate), silica, calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company); or mixtures thereof. Such pigmented coating compositions have a pigment volume concentration (PVC) in the range of from 0 to 40% or from 10 to 30%. PVC is calculated according to the following equation, PVC (%)=Total volume of pigments and fillers/Total dry volume of coating composition.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, in an amount of from 0 to 1%, from 0.01 to 0.8%, or from 0.03% to 0.5%.

The aqueous coating composition of the present invention may further comprise one or more thickeners, also known as "rheology modifiers". The thickeners may include polyvinyl alcohol, clay materials, acid derivatives, acid copolymers, urethane associate thickeners, polyether urea polyurethanes, polyether polyurethanes, or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present, by weight based on the total weight of the aqueous coating composition, in an amount of from 0 to 3%, from 0.05% to 2%, or from 0.1% to 1%.

The aqueous coating composition of the present invention may further comprise one or more wetting agents. "Wetting agents" herein refer to chemical additives that reduce the surface tension of a coating composition, causing the aqueous coating composition to more easily spread across or penetrate the surface of a substrate. Wetting agents may be polycarboxylates, anionic, zwitterionic, or non-ionic. The wetting agent may be present, by weight based on the total weight of the aqueous coating composition, in an amount of from 0 to 2.5%, from 0.1% to 2%, or from 0.2% to 1%.

The aqueous coating composition of the present invention may further comprise one or more coalescents. "Coalescents" herein refer to slow-evaporating solvents that fuse polymer particles into a continuous film under ambient condition. Examples of suitable coalescents include texanol, 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, in an amount of from 0 to 10%, from 0.1% to 9%, or from 1% to 8%.

The aqueous coating composition of the present invention may further comprise water. The concentration of water may be, by weight based on the total weight of the aqueous coating composition, from 30% to 90%, from 40% to 80%, or from 60% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, plasticizers, leveling agents, thixotropic agents, adhesion promoters, and grind vehicles. These additives may be present, by weight based on the total weight of the aqueous coating composition, in a combined amount of from 0 to 10%, from 0.001% to 10%, or from 0.01% to 2%. The solids content of the aqueous coating composition may be from 30% to 55% by volume.

The aqueous coating composition of the present invention may be prepared with techniques known in the coating art. The process of preparing the aqueous coating composition of the present invention may comprise by admixing the aqueous polymer dispersion with other optional components as described above. Components in the aqueous coating composition may be mixed in any order to provide the aqueous coating composition of the present invention. Any of the above-mentioned optional components may also be added to the composition during or prior to the mixing to form the aqueous coating composition. For example, optionally, at least one pigment is well dispersed in an aqueous medium under high shear such as is afforded by a COWLES mixer or, in an alternative, at least one pre-dispersed pigment may be used. Then the aqueous polymer dispersion is added under low shear stirring along with other optional components as described above.

The aqueous coating composition of the present invention has good heat-age stability as indicated by ΔKU of 10 KU or less after heat aging at 50° C. for 7 days according to the test method described in Examples section below. The aqueous coating composition also exhibits less than 5% rust and a blister rating "2F" or better at a dry film thickness of 50±10 μm after at least 240 hours of exposure to salt spray when coated onto a corrosion susceptible substrate, such as cold rolled steel. The salt spray test may be conducted according to the ASTM B-117-2011 method. The aqueous coating composition may also demonstrate an adhesion rating of "4B" or higher or even "5B", according to the ASTM D3359-2009 method; or a water resistance level of "2F" or better according to the test method described in the Examples section below; at a dry film thickness of 50±10 μm, when coated onto a corrosion susceptible substrate such as cold rolled steel.

The present invention also provides a method of improving corrosion resistance of a corrosion susceptible substrate, such as metal. The method comprises: providing the aqueous coating composition of the present invention, applying the aqueous coating composition to a metal substrate, and drying, or allowing to dry, the aqueous coating composition to form a coating. "Improving corrosion resistance" means a coating have improved corrosion resistance property, that is, the coating with a thickness of 50±10 μm exhibits less than 5% rust and a blister rating "2F" or better after at least 240 hours of exposure to salt spray according to ASTM B-117-2011 method.

The aqueous coating composition of the present invention can be applied to, and adhered to, a substrate such as metal, primed surfaces and previously painted surfaces. The aqueous coating composition on the substrate is dried, or allowed to dry at 5-25° C., or at an elevated temperature, for example, from 35° C. to 60° C. to form a film (this is, coating).

The present invention also provides a method of preparing a coating. This method may comprise forming the aqueous coating composition of the present invention, applying the aqueous coating composition to a substrate, and drying, or allowing to dry, the applied coating composition to form the coating.

The present invention also relates to a process of using the aqueous coating composition of the present invention. The process may comprise applying the aqueous coating composition to a substrate, and drying, or allowing to dry, the applied coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used.

The aqueous coating composition is suitable for various coating applications, such as marine protective coatings, general industrial finishes, metal protective coatings, wood coatings, architecture coatings, traffic paints, paper coatings, and leather coatings. The aqueous coating composition is particularly suitable for metal protective coatings. The aqueous coating composition can be used as a primer, a topcoat, as one-coat direct-to-metal coating, or in combination with other coatings to form multi-layer coatings.

EXAMPLES

Some embodiments of the invention will now be described in the following Examples, wherein all parts and percentages are by weight unless otherwise specified.

The following materials are used in preparing aqueous polymer dispersions in the examples:

Styrene ("ST"), 2-ethylhexyl acrylate ("2-EHA"), methacrylic acid ("MAA"), and methyl methacrylate ("MMA") are all available from Oriental Company.

Acrylonitrile ("AN") is available from Shanghai Huayi Company.

Ammonium persulphate ("APS") and ammonia are from Sinopharm Chemical Reagent Co., Ltd. (SCRC).

HITENOL AR-1025 ("AR-1025") surfactant, available from Daiichi Kogyo Seiyaku Co., Ltd., is tristyrylphenol ethoxylate polymerizable surfactant.

Cyclohexyl methacrylate ("CHMA") is available from BASF.

Phosphoethyl methacrylate ("PEM") and methacrylo ethylethylene urea ("MEUR") are both available from The Dow Chemical Company.

n-Dodecyl mercaptan ("n-DDM"), available from Sinopharm Chemical Reagent Co. Ltd., is used as a chain transfer agent.

RHODAFAC RS-610 ("RS-610") surfactant, available from Solvay, is used as a phosphate surfactant.

DISPONIL FES-32 ("FES-32") surfactant is available from BASF.

KATHON™ XL 1.5% biocide is available from The Dow Chemical Company (KATHON is a trademark of The Dow Chemical Company).

NOPCO NDW defoamer is available from San Nopco.

The following standard analytical equipment and methods are used in the Examples.

Heat-Age Stability

A Stormer Viscosity Meter was used to test the viscosity of a coating composition according to the ASTM D562 method. After the coating composition was prepared, an initial medium shear viscosity, Initial Krebs Units (KU), of the coating composition was tested at room temperature, then the coating composition was balanced at room temperature overnight. The coating composition was then placed in an oven at 50° C. for 7 days. The viscosity of the coating composition after storage was then tested and recorded as Final KU. The difference between Initial KU and Final KU was defined as the viscosity change, ΔKU. The smaller the ΔKU value, the better the heat-age stability. A coating composition showing ΔKU of 10 KU or less is considered to be passed. Otherwise, if ΔKU is larger than 10 KU, the coating composition failed the heat-age stability test.

Corrosion resistance, adhesion, and water resistance properties of coating films were evaluated on coated panels according to the following test methods. The panels were prepared by drawing down coating compositions on a cold rolled steel substrate and dried for 7 days in a controlled temperature room at 23° C./50% relative humidity to give panels with a dry film thickness of 50±10 μm. The obtained coated panels were evaluated according to the following test methods.

Salt-Spray Test

Corrosion resistance was tested by exposure of the as prepared panels to a salt spray environment (5% sodium chloride fog) in accordance with the ASTM B-117-2011 method. Exposed cold rolled steel was covered with tape (3M plastic tape #471) prior to exposure. A scribe mark made with a razor blade was scratched into the bottom half of the panels obtained above immediately before exposure. The panels were exposed to the salt spray environment for 240 hours, and then removed from the salt spray environment to rate blister and rust. The results were presented as blister/rust ratings. Blister ratings were conducted in accordance with the ASTM D714-02(2009) method and comprised a number and one or more letters, as shown in Table 1. The letter is a qualitative representation of the density of bubbles. The number refers to the size of the blister, whereby 2 is the largest size, 8 is the smallest size, and 10 is no blister. The bigger the number, the smaller the size of blister. The abbreviation F, M, MD and D stand for the density of bubbles. Rust ratings were shown as a percentage of rust on a panel as according to the ASTM D610-2001 test method, as shown in Table 2. Therefore, a result of 8F/3% rust means that there were a few very small blisters with 3% of the panel covered by rust. The panels with blister rating being 2F or better and with less than 5% rust are acceptable.

TABLE 1

Blister Rating Criteria

| Density of blister | Abbreviation | Size of Blister | Rating |
|---|---|---|---|
| Few | F | Much Big bubble | 2 |
| Medium | M | Big bubble | 4 |
| Medium dense | MD | Small to middle bubble | 6 |
| Dense | D | Very small bubble | 8 |
|  |  | No bubble | 10 |

TABLE 2

Rust Rating Criteria

| Rusting degree | Rust area, % |
|---|---|
| None | 0 |
| Very slight | 1 |
| Slight | 5 |
| A few rust | 15 |
| Much rust | 50 |
| Rust all | 100 |

Adhesion Test

The as prepared panels were evaluated for adhesion properties according to the ASTM D3359-2009 method. An X-cut was made through the film to the substrate of the panels, then a pressure sensitive tape was applied over the cut and then removed. As shown in Table 3, adhesion of the film to the substrate was rated on a scale of 0~5 according to the area of the film removed, whereby 5B is the best and 0B is the worst. The panels with rating being 4B or higher have acceptable adhesion to the substrate.

TABLE 3

| Removed Area | Rating |
|---|---|
| No peeling or removal | 5B |
| Trace peeling or removal along incisions or at their intersection | 4B |
| Jagged removal along incisions up to 1.6 mm | 3B |
| Jagged removal along most of incisions up to 3.2 mm | 2B |
| Removal from most of the area of the X under the tape | 1B |
| Removal beyond the area of X | 0B |

Water Resistance

The as prepared panels were dipped in deionized (DI) water and blister and rust area on the panels were observed at different interval time. The water resistance of the panels after 300 hours was rated based on the blister rating given in Table 1 and rust rating given in Table 2. Water resistance rating after 300 hours being 2F or better indicates acceptable water resistance. Otherwise, water resistance poorer than 2F is unacceptable.

Example (Ex) 1

A monomer emulsion was prepared by dissolving AR-1025 surfactant (52.00 g, 25% active) in DI water (455.00 g) and then mixing with 2-EHA (560.95 g), MEUR (3.20 g, 50% solids), ST (566.80 g), CHMA (343.93 g), MAA (30.50 g), n-DDM (7.50 g), and PEM (22.70 g) with stirring.

In a 4-necked, 5 liter round bottom flask equipped with a thermocouple, a cooling condenser and an agitator, a solution containing AR-1025 surfactant (40.00 g, 25% active) and DI water (1075.00 g) was added and heated to 85° C. under nitrogen. An aqueous sodium carbonate solution (1.4 g of sodium carbonate in 38 g of DI water), an aqueous ammonium persulfate (APS) initiator solution (1.4 g of APS in 15 g of DI water), and 4.1% of the monomer emulsion were added to the flask. Within about 5 minutes, initiation of polymerization was confirmed by the increase of temperature by 3° C. and a change of the external appearance of the reaction mixture. After generation of heat had ended, the remainder of the monomer emulsion was added gradually to the flask over a period of 90 minutes, with stirring. Polymerization reaction temperature was maintained at 87-89° C. After completing the addition, the vessel that contained the monomer emulsion and feeding pipes leading into the flask were rinsed with 30 g of DI water, and the rinse was added back to the flask. The reaction mixture was held at 85° C. for 10 minutes, and then cooled to 80° C. A catalyst (7.99 g of t-butylhydroperoxide) and a reductant (3.68 g of isoascorbic acid) were added together to chase the monomers over 30 minutes. After the chaser stage, the reaction was cooled to 50° C. and then neutralized to pH 7.0-8.0 by ammonia. The reaction mixture was held at 45-50° C. for 10 minutes, and then 3.67 g of KATHON XL 1.5% biocide and 0.38 g of NOPCO NDW defoamer were added over 10 minutes. The reaction was cooled to room temperature to obtain the aqueous polymer dispersion.

Ex 2

The aqueous polymer dispersion of Ex 2 was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (26.00 g, 25% active) in DI water (455.00 g) and then mixing with 2-EHA (560.95 g), MEUR (45.70 g, 50% solids), ST (569.00 g), CHMA (343.39 g), MAA (51.60 g), n-DDM (7.50 g), and PEM (3.20 g) with stirring.

Prior to adding the monomer emulsion, a solution containing AR-1025 surfactant (35.00 g, 25% active) and DI water (1075.00 g) was added to the flask.

Ex 3

The aqueous polymer dispersion of Ex 3 was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (26.00 g, 25% active) in DI water (455.00 g) and then mixing with 2-EHA (560.95 g), MEUR (21.08 g, 50% solids), ST (549.00 g), CHMA (343.39 g), MAA (50.20 g), n-DDM (7.50 g), and PEM (3.20 g) with stirring.

Prior to adding the monomer emulsion, a solution containing AR-1025 surfactant (35.00 g, 25% active) and DI water (1075.00 g) was added to the flask.

Ex 4

The aqueous polymer dispersion of Ex 4 was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (26.00 g, 25% active) in DI water (455.00 g) and then mixing with 2-EHA (560.95 g), MEUR (21.08 g, 50% solids), ST (549.00 g), CHMA (343.39 g), MAA (8.00 g), n-DDM (7.50 g), and PEM (46.00 g) with stirring.

Prior to adding the monomer emulsion, a solution containing AR-1025 surfactant (35.00 g, 25% active) and DI water (1075.00 g) was added to the flask.

Ex 5

The aqueous polymer dispersions of Ex 5 was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (14.00 g, 25% active) in DI water (455.00 g) and then mixing with 2-EHA (56.95 g), MEUR (21.08 g, 50% solids), ST (549.00 g), CHMA (343.39 g), MAA (23.00 g), n-DDM (7.50 g), and PEM (31.00 g) with stirring.

Prior to adding the monomer emulsion, a solution containing AR-1025 surfactant (35.00 g, 25% active) and DI water (1075.00 g) was added to the flask.

Comparative (Comp) Ex A

A monomer emulsion was prepared by dissolving AR-1025 surfactant (14.00 g, 25% active) in DI water (455.00 g) and then mixing with 2-EHA (560.95 g), MEUR (21.08 g, 50% solids), ST (549.00 g), CHMA (343.39 g), MAA (23.00 g), n-DDM (7.50 g), and PEM (31.00 g) with stirring.

In a 4-necked, 5 liter round bottom flask equipped with a thermocouple, a cooling condenser and an agitator, a solution containing RS-610 surfactant (35.00 g, 25.0% active) and DI water (1075 g) was added and heated to 85° C. under nitrogen. An aqueous sodium carbonate solution (1.4 g of sodium carbonate in 38 g of DI water), an aqueous APS initiator solution (1.4 g of APS in 15 g of DI water), and 4.1% of the monomer emulsion were added to the flask. Within about 5 minutes, initiation of polymerization was confirmed by the increase of temperature by 3° C. and a change of the external appearance of the reaction mixture. After generation of heat had ended, the remainder of the monomer emulsion was added gradually to the flask over a period of 90 minutes, with stirring. Polymerization reaction temperature was maintained at 87-89° C. After completing the addition, the vessel that contained the monomer emulsion and feeding pipes leading into the flask were rinsed with 30 g DI water, and the rinse was added back to the flask. The reaction mixture was held at 85° C. for 10 minutes, and then cooled to 80° C. A catalyst (8.00 g of t-butylhydroperoxide) and a reductant (4.80 g of isoascorbic acid) were added together to chase the monomers over 30 minutes. After the chaser stage, the reaction was cooled to 50° C. and then neutralized to pH 7.0-8.0 by ammonia. The reaction mixture was held at 45-50° C. for 10 minutes, and then 3.67 g of KATHON XL 1.5% biocide and 0.38 g of NOPCO NDW defoamer were added over 10 minutes. The reaction was cooled to room temperature to obtain the aqueous polymer dispersion.

Comp Ex B

The aqueous polymer dispersion of Comp Ex B was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (28.00 g, 25% active) in DI water (450.00 g) and then mixing with 2-EHA (453.0 g), MMA (47.00 g), ST (500.00 g), AN (23.00 g), and MAA (52.75 g) with stirring.

Prior to adding the monomer emulsion, a solution containing AR-1025 surfactant (40.00 g, 25% active) and DI water (1050.00 g) was added to the flask.

Comp Ex C

The aqueous polymer dispersion of Comp Ex C was prepared based on the same procedure as preparing the aqueous polymer dispersion in Comp Ex A, except that the monomer emulsion used and the dosage of RS-610 surfactant directly added to the flask were as follows, A monomer emulsion was prepared by dissolving FES-32 surfactant (16.50 g, 31% active) in DI water (1075.00 g) and then mixing with 2-EHA (560.95 g), MMA (343.39 g), ST (527.00 g), MAA (52.75 g), and MEUR (21.08 g, 50% solids) with stirring.

Prior to adding the monomer emulsion, a solution containing RS-610 surfactant (35.00 g, 25.0% active) and DI water (1075.00 g) was added to the flask.

Comp Ex D

The aqueous polymer dispersion of Comp Ex D was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (26.00 g, 25% active) in DI water (455.00 g) and then mixing with 2-EHA (595.00 g), MMA (47.00 g), ST (505.00 g), MAA (50.00 g), and AN (235.00 g) with stirring.

Prior to adding the monomer emulsion, a solution containing AR-1025 surfactant (26.00 g, 25% active) and DI water (455.00 g) was added to the flask.

Comp Ex E

The aqueous polymer dispersion of Comp Ex E was prepared based on the same procedure as preparing the aqueous polymer dispersion in Comp Ex A, except that the monomer emulsion used the dosage of RS-610 surfactant directly added to the flask were as follows, A monomer emulsion was prepared by dissolving FES-32 surfactant (16.50 g, 31% active) in DI water (1075.00 g) and then mixing with 2-EHA (560.95 g), CHMA (343.39 g), ST (527.00 g), MAA (40.75 g), n-DDM (7.50 g), and PEM (21.08 g) with stirring.

Prior to adding the monomer emulsion, a solution containing RS-610 surfactant (26.00 g, 25.0% active) and DI water (1050.00 g) was added to the flask.

Comp Ex F

The aqueous polymer dispersion of Comp Ex F was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (30.00 g, 25% active) in DI water (455.00 g) and then mixing with 2-EHA (560.00 g), MEUR (21.08 g, 50% solids), ST (569.00 g), CHMA (343.39 g), MAA (51.60 g), n-DDM (7.50 g), and PEM (70.50 g), with stirring.

Prior to adding the monomer emulsion, a solution containing AR-1025 surfactant (26.00 g, 25% active) and DI water (1075.00 g) was added to the flask.

Comp Ex G

The aqueous polymer dispersion of Comp Ex G was prepared based on the same procedure as preparing the aqueous polymer dispersion in Ex 1, except that the monomer emulsion used and the dosage of AR-1025 surfactant directly added to the flask are as follows, A monomer emulsion was prepared by dissolving AR-1025 surfactant (35.0 g, 25% active) in DI water (1075 g) and then mixing with 2-EHA (560.95 g), MEUR (3.20 g, 50% solids), ST (550.00 g), CHMA (343.39 g), MAA (30.50 g), n-DDM (7.50 g), and PEM (22.70 g) with stirring.

Prior to adding the monomer emulsion, a solution containing AR-1025 surfactant (16.5 g, 25% active) and DI water (455 g) was added to the flask.

Properties of the obtained aqueous polymer dispersions are given in Table 4.

TABLE 4

| Polymer Dispersion | pH | Solids (%) | Viscosity[1] (cp) | Particle Size[2] (nm) |
|---|---|---|---|---|
| Ex 1 | 7.41 | 40.18 | 30 | 77 |
| Ex 2 | 8.33 | 42.54 | 40 | 103 |
| Ex 3 | 8.13 | 42.24 | 46 | 100 |
| Ex 4 | 7.64 | 42.72 | 27 | 85 |
| Ex 5 | 7.18 | 43.03 | 39 | 84 |
| Comp Ex A | 7.75 | 42.06 | 46 | 92 |
| Comp Ex B | 7.82 | 42.32 | 48 | 95 |
| Comp Ex C | 7.68 | 41.98 | 45 | 94 |
| Comp Ex D | 8.12 | 41.92 | 44 | 89 |
| Comp Ex E | 7.84 | 41.78 | 36 | 93 |
| Comp Ex F | 7.57 | 41.66 | 32 | 95 |
| Comp Ex G | 7.19 | 41.08 | 32 | 93 |

[1]Viscosity was measured by a Brookfield Viscometer
[2]Particle Size is the average particle size measured by BI-90 Plus Particle Size Analyzer Paints 1-5 and Comp Paints A-G The aqueous polymer dispersions obtained above were used as binders to prepare paint formulations of Paints 1-5 and Comp Paints A-G, based on formulations given in Table 5 and binder types given in Table 6. Ingredients listed in Table 5 including DB, BYK-190, iron oxide black, black carbon, HALOX SZP-391, and Talc 800 were mixed using a high speed Cowles disperser at 1500 rpm to form the grind. Water, binder, DB, sodium nitrite (15%), AMP-95, and BYK-024 were then added into the grind and mixed for 30 minutes using a lab mixer at 500 rpm.

TABLE 5

Paint Formulation

| Raw Materials | Kilograms | Function | Supplier |
|---|---|---|---|
| Grind | | | |
| Diethylene glycol monobutyl ether ("DB") | 12.00 | Coalescent | The Dow Chemical Company |
| BYK-190 acid block copolymer | 1.00 | Dispersant | BYK |
| Iron oxide black | 3.00 | Anti-corrosion pigment | Bayer |
| PRINTEX Black Carbon | 0.50 | Black carbon | Evonik |
| HALOX SZP-391 | 4.00 | Anti-corrosion pigment | Halox |
| Talc 800 | 7.00 | Extender | Jiaoling Chemical |
| Letdown | | | |
| Water | 5.00 | | |
| Binder | 60.00 | Binder | |
| DB | 4.00 | Coalescent | The Dow Chemical Company |
| Sodium Nitrite (15%) | 0.20 | Flush corrosion agent | Sinopharm Chemical |
| AMP-95 ™ (2-amino-2-methyl-1-propanol) | 0.12 | pH adjuster | ANGUS Chemical Company |
| BYK-024 polysiloxane | 0.10 | Defoamer | BYK Chemical |
| Total | 96.92 | | |

The above obtained paints were evaluated according the test methods described above and results are shown in Table 6. As shown in Table 6, paints 1-5 of the present invention all passed heatage stability test, and showed good corrosion resistance as indicated by blister rating being 2F or better and with less than 5% rust as determined by the salt-spray test, good adhesion (rating: 5B), and a water resistance level of 10 (300 hours). In contrast, Comp Paints A-F all showed poor corrosion resistance. In addition, the binders of Comp Exs A-C didn't comprise polymerized units of AR-1025 or PEM resulted in poor adhesion of the coating films to the substrate (Comp Paints A and B) or poor water resistance (Comp Paints B and C). Comp Paint F further failed the heatage stability test and showed poor water resistance. Comp Paint G showed grits after heatage at 50° C. for 7 days, indicating poor heat-age stability.

TABLE 6

| Paint | Binder | SSR (240 hours) | Adhesion | Water resistance (300 hours) | Heat-age stability |
|---|---|---|---|---|---|
| Paint 1 | Ex 1 | 4F/1% rust | 5B | 10 | Pass |
| Paint 2 | Ex 2 | 2F/3% rust | 5B | 10 | Pass |
| Paint 3 | Ex 3 | 8F/no rust | 5B | 10 | Pass |
| Paint 4 | Ex 4 | 4F/4% rust | 5B | 10 | Pass |
| Paint 5 | Ex 5 | 2F/1% rust | 5B | 10 | Pass |
| Comp Paint A | Comp Ex A | 4MD/10% rust | 3B | 6F | Pass |
| Comp Paint B | Comp Ex B | 4D/5% rust | 3B | 8M | Pass |
| Comp Paint C | Comp Ex C | 2M/5% rust | 4B | 6M | Pass |
| Comp Paint D | Comp Ex D | 2MD/10% rust | 4B | 6F | Pass |
| Comp Paint E | Comp Ex E | 8M/3% rust | 4B | 10- | Pass |
| Comp Paint F | Comp Ex F | 4M/5% rust | 5B | 8M | Fail |
| Comp Paint G | Comp Ex G | 6F/2% rust | 4B | 10 | Grits |

What is claimed is:

1. An aqueous polymer dispersion wherein the polymer comprises as polymerized units, based on the weight of the polymer,
   (a) from 30% to 50% by weight of styrene,
   (b) from 0.2% to 3.0% by weight of phosphoethyl (meth)acrylate,
   (c) from 0.2% to 1.2% by weight of a ureido monomer having the following structure:

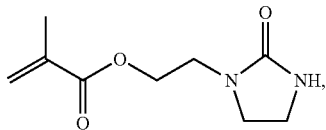

(d) from 0.5% to 2.5% by weight of a polymerizable surfactant having the following structure:

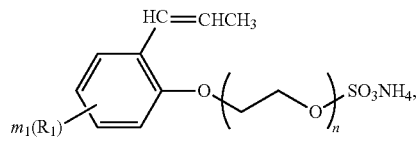

wherein $R_1$ is

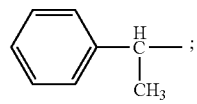

$m_1$ is 1, 2, or 3; and n is an integer in the range of from 3 to 50;
   (e) from 30% to 40% by weight of 2-ethylhexyl acrylate; and
   (f) from 15% to 30% by weight total of methacrylic acid and cyclohexyl methacrylate;
wherein an aqueous metal protective coating composition derived from the aqueous polymer dispersion exhibits:
   a change in Krebs Units (KU) of 10 KU or less after heat aging at 50° C. for 7 days; and
   less than 5% rust and a blister rating of "2F" or better as measured in accordance with ASTM D714-02(2009) at a dry film thickness of 50±10 micrometers after 240 hours of exposure to salt spray (5% sodium chloride fog) in accordance with ASTM B-117-11 when coated onto cold rolled steel.

2. The aqueous polymer dispersion of claim 1 wherein the polymer has a glass transition temperature of from 20° C. to 60° C.

3. The aqueous polymer dispersion of claim 1 wherein the polymer comprises as polymerized units, based on the weight of the polymer, from 0.5% to 2.0% by weight of the phosphorous-containing (meth)acrylate.

4. The aqueous polymer dispersion of claim 1 wherein the polymer comprises as polymerized units, based on the weight of the polymer, from 0.5% to 1.0% by weight of the ureido monomer.

5. An aqueous metal protective coating composition comprising the aqueous polymer dispersion of claim 1.

6. A coated metal substrate prepared by:
   applying the aqueous metal protective coating composition of claim 5 to a metal substrate, and
   drying the applied aqueous metal protective coating composition or allowing the applied aqueous metal protective coating composition to dry.

7. A method of improving the corrosion resistance of a metal substrate, the method comprising:
   applying the aqueous metal protective coating composition of claim 5 to a metal substrate, and
   drying the applied aqueous metal protective coating composition or allowing the applied aqueous metal protective coating composition to dry, thereby forming a coating film,
   wherein the coating film exhibits less than 5% rust and a blister rating of "2F" or better as measured in accordance with ASTM D714-02(2009) at a dry film thickness of 50±10 micrometers after 240 hours of exposure to salt spray (5% sodium chloride fog) in accordance with ASTM B-117-11.

* * * * *